N. B. CONVERSE.
RAPID WEIGHING SCALE.
APPLICATION FILED SEPT. 3, 1907. RENEWED SEPT. 26, 1910.
1,029,170.
Patented June 11, 1912.
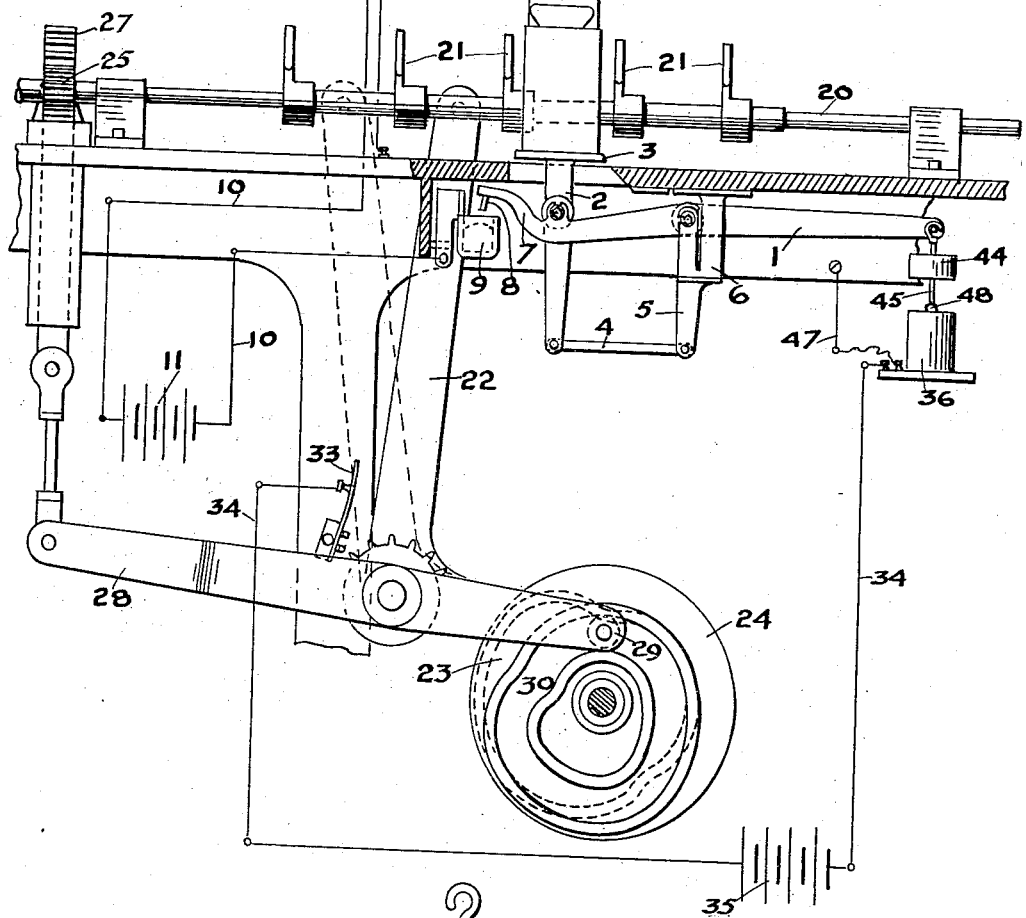
WITNESSES:
N. Keating
Leon Boillot
INVENTOR,
N. B. Converse
BY
F. M. Wright
ATTORNEY.

UNITED STATES PATENT OFFICE.

NEWTON B. CONVERSE, OF FRESNO, CALIFORNIA, ASSIGNOR TO HIMSELF, J. E. DICKINSON, FRANCIS M. WRIGHT, B. W. NORTON, L. Z. ICKES, AND K. ARAKLIAN, TRUSTEES.

RAPID-WEIGHING SCALE.

1,029,170.    Specification of Letters Patent.    Patented June 11, 1912.

Application filed September 3, 1907, Serial No. 391,043. Renewed September 26, 1910. Serial No. 583,801.

*To all whom it may concern:*

Be it known that I, NEWTON B. CONVERSE, a citizen of the United States, residing at Fresno, in the county of Fresno and State of California, have invented new and useful Improvements in Rapid-Weighing Scales, of which the following is a specification.

The object of the present invention is to provide weighing scales adapted for the rapid weighing in succession of a number of articles, such as receptacles filled with commercial commodities. The apparatus is primarily intended for use in automatic packing and weighing machines, in which receptacles such as cartons, are filled by a suitable filling device up to a predetermined weight, whereupon the descent of the scale pan automatically shuts off the filling device, and the filled receptacle is advanced to make room on the scale pan for another receptacle to be filled in the same way. When such a machine is operated rapidly, it may happen that, after the weighing has been completed, the package removed, and an empty receptacle substituted therefor, and the scale pan has risen again and said latter receptacle is being filled, the filling of the receptacle may approach completion while the scale pan is still moving or rather vibrating vertically. Should this be so, the result would be inaccuracy in weighing; for, if the scale pan is ascending at the time the full weight is supplied to the receptacle, the scale pan would not immediately drop and thus shut off the filling device, but it would be necessary to supply an excess of material, in order to overcome the momentum of the upwardly moving parts and cause the scale pan to drop. On the other hand, should the scale pan be descending when the filling of the receptacle is approaching completion, then somewhat less than the full weight would be sufficient to cause it to make the complete descent and so shut off the filling device.

The object of the present invention is to quickly bring the scale pan to rest before the time arrives when the filling is nearly complete, so that it will be completely at rest at the time when the proper quantity of material has been discharged into the receptacle.

In the accompanying drawing, Figure 1 is a side view, partly in section, of my improved weighing scales, showing also an apparatus for advancing packages in succession on to the scale pan; and Fig. 2 is an enlarged vertical section of the solenoid used for arresting the movement of the scale pan.

Referring to the drawing, 1 indicates a scale beam, having pivoted thereto the stem 2 of a scale pan 3, the lower end of which stem is, in order to maintain said stem in a vertical position, pivotally connected by a link 4 to a downward extension 5 of the pivot support 6 of the scale beam. The scale beam has a forward extension 7 which carries a contact pin 8 adapted to contact with mercury in a vessel 9, and thereby to close an electric circuit 10 through a battery 11, and a magnet 12, which magnet attracts an armature 13 connected by a link 14 to a shutter 15 of a feed chute 16, so that when said circuit is closed the shutter is also closed, to shut off the supply of material to the carton or other receptacle.

For the purpose of illustrating the utility of the invention there is herein shown a portion of a packing machine for feeding packages, such as cartons, on to the scale pan. This mechanism comprises a slidable bar 20, which carries a series of fingers 21 spaced at equal intervals on said bar, said bar being adapted to be moved longitudinally by a vibrating arm 22, actuated by a roller in a cam groove 23 on the rear side of a rotating cam plate 24, and said bar being also caused to rock by means of a pinion 25, through which the bar can slide, and with which it turns, which pinion is rocked by means of a rack 27 reciprocated by a rocking lever 28, the rear end of which lever carries a roller 29 which moves in a cam groove 30 on the front side of the rotating cam plate 24. These cam grooves 23 and 30 are so formed as to cause the fingers 21 to move, in each cycle of their operation, first, forward, to advance cartons or packages, then outward, to free themselves from said cartons, then backward, to assume the same longitudinal positions relatively to the next succeeding cartons respectively, and then inward, so as to assume positions immediately behind said succeeding cartons respectively. The operation is then repeated in the same cycle. By this means a filled carton is pushed forward from off the scale pan, and an empty carton is moved into its place on the scale pan, which scale pan thereupon rises and breaks the aforesaid electric circuit and opens the said supply.

Should it be attempted to operate such a machine rapidly, it is found that the vertical reciprocation which commences on the rise of the scale pan may not be completed at the time the carton thereon is filled or nearly so. In such a case, if the scale pan is rising at the time that the full weight has been supplied to the carton, then on account of its upward momentum at that time, said scale pan would not thereby be caused to descend, which would result in the material supplied to the carton being in excess of the proper weight. On the contrary, should the scale pan be descending at that time, then less than the proper weight would suffice to close the electric circuit and shut off the supply. This result, therefore, limits the speed of the machine, and in order to increase the speed and still obtain accurate weighing, I provide means for stopping the vibration of the scale beam before the weighing is completed. For this purpose the arm 22 in its forward movement contacts with a spring contact 33, from which a wire 34 leads to a battery 35 and then to a solenoid 36. Said solenoid comprises a metal cylindrical casing, a support 38 of insulating material, a cast iron base 39, coils 40, a cast iron cover 41, and washers 42, 43 of non-magnetic material, preferably fiber, separating said base and cover from the coils. The hole in the solenoid is considerably larger in diameter than the core 48, to allow perfect freedom of movement of the core, which, of course, forms a part of the scale weight 44, and is attached thereto by a hanger bar 45. There is provided a washer 49 on the lower end of the core, of greater diameter than the core, but of less diameter than the interior of the solenoid. This is used for the purpose of preventing any residual magnetism, which would affect the core at the instant of weighing. A wire 47 leads from the other pole of the solenoid to the frame of the machine, which is in electric connection with the arm 22. When the arm 22 advances to move the filled carton from off the scale pan and to replace it by an empty carton, at the completion of the forward movement of said arm, when the empty carton has been placed on the scale pan, and the latter is therefore ready to rise, the electric circuit is closed through the solenoid, which thereby attracts the core 48, and not only assists the weight 44 on the other arm of the scale beam to raise said scale pan to its upper position, but holds it there, against any tendency of the scale beam to vibrate, until the arm 22 moves backward sufficiently to break the circuit. By that time all motion of the scale pan has ceased, and the scale pan is quite stationary in its upper position, so that the scale pan will again descend only when the carton is accurately filled with the weight desired.

I claim:—

1. In weighing scales, the combination of a scale beam, a load supporting member at one end of said beam, a weight at the other end thereof, an electro-magnetic device adjacent to one end, and means actuated by said electro-magnetic device when energized to move the load supporting end of the scale beam into the position corresponding with the upper position of the load supporting member when a load has been removed therefrom, substantially as described.

2. In weighing scales, the combination of a scale beam, a load supporting member carried by said scale beam, means for balancing the weight of material on said pan, an electro-magnetic device arranged to attract the scale beam to the position it assumes when the load has been removed from said member, and to hold it in said position, and means for energizing said electro-magnetic device, substantially as described.

3. In weighing scales, the combination of a scale beam, a scale pan at one end of said beam, a weight at the other end thereof, a solenoid, a core for said solenoid connected with said weight to swing therewith, and means for energizing said solenoid, substantially as described.

4. In weighing scales, the combination of a scale beam, a scale pan at one end thereof, a weight at the other end, a core attached to said weight, a solenoid into which said core can pass, means for moving a filled receptacle from said scale pan and for placing an empty receptacle thereon, and means operatively connected with said latter means for energizing said solenoid, substantially as described.

5. In weighing scales, the combination of a scale beam, a load supporting member at one end thereof, a weight at the other end, means for moving a filled receptacle from said scale pan and for placing an empty receptacle thereon, and an auxiliary device operatively connected with said latter means for positively bringing said scale beam to rest immediately after the said movement, substantially as described.

In testimony whereof I have hereunto set my hand in the presence of two subscribing witnesses.

NEWTON B. CONVERSE.

Witnesses:
 FRANCIS M. WRIGHT,
 D. B. RICHARDS.

---

Copies of this patent may be obtained for five cents each, by addressing the "Commissioner of Patents, Washington, D. C."